US006961540B1

(12) United States Patent
Kondoh

(10) Patent No.: US 6,961,540 B1
(45) Date of Patent: Nov. 1, 2005

(54) INFORMATION PROCESSING SYSTEM AND CAMERA SYSTEM

(75) Inventor: Takashi Kondoh, Chofu (JP)

(73) Assignee: Olympus Optical Co., Ltd., Tokyo (JP)

( * ) Notice: Subject to any disclaimer, the term of this patent is extended or adjusted under 35 U.S.C. 154(b) by 916 days.

(21) Appl. No.: 09/604,352

(22) Filed: Jun. 27, 2000

(30) Foreign Application Priority Data

Jun. 28, 1999 (JP) ................................. 11-181599

(51) Int. Cl.7 ........................................... H04Q 7/20
(52) U.S. Cl. ...................... 455/41.2; 455/73; 455/558; 455/557; 705/18; 705/41; 705/44; 379/110.01
(58) Field of Search ...................... 348/211.2, 211.1, 348/211.3, 211.9; 455/420, 452.2, 412.1, 455/572, 403, 411, 41.2, 70, 73, 558, 557, 455/418, 419; 235/382, 383, 385, 472–487; 379/102.01, 88.01, 67.1, 16; 705/18, 41, 705/44

(56) References Cited

U.S. PATENT DOCUMENTS

| | | | | |
|---|---|---|---|---|
| 5,404,355 A | * | 4/1995 | Raith | 370/311 |
| 5,577,103 A | * | 11/1996 | Foti | 455/412.1 |
| 5,752,193 A | * | 5/1998 | Scholefield et al. | 455/452.2 |
| 5,875,395 A | * | 2/1999 | Holmes | 455/420 |
| 5,963,624 A | * | 10/1999 | Pope | 379/110.01 |
| 6,021,324 A | * | 2/2000 | Sizer et al. | 455/403 |
| 6,160,511 A | * | 12/2000 | Pfeil et al. | 342/457 |
| 6,418,326 B1 | * | 7/2002 | Heinonen et al. | 455/558 |
| 6,431,439 B1 | * | 8/2002 | Suer et al. | 235/380 |
| 6,433,737 B2 | * | 8/2002 | Katz | 342/367 |
| 6,487,403 B2 | * | 11/2002 | Carroll | 455/419 |
| 6,504,480 B1 | * | 1/2003 | Magnuson et al. | 340/571 |
| 2002/0085515 A1 | * | 7/2002 | Jaynes et al. | 370/329 |
| 2003/0073412 A1 | * | 4/2003 | Meade | 455/70 |
| 2004/0192206 A1 | * | 9/2004 | Hirvonen | 455/41.2 |
| 2005/0017068 A1 | * | 1/2005 | Zalewski et al. | 235/380 |

FOREIGN PATENT DOCUMENTS

| | | | | |
|---|---|---|---|---|
| GB | 2342816 A | * | 4/2000 | G06F 13/00 |
| JP | 5-127246 | | 5/1993 | |
| JP | 8-315106 | | 11/1996 | |

* cited by examiner

Primary Examiner—Emmanuel L. Moise
Assistant Examiner—Julio Perez
(74) Attorney, Agent, or Firm—Frishauf, Holtz, Goodman & Chick, P.C.

(57) ABSTRACT

An information processing (camera) system comprises a radio communication terminal (medium) and an information appliance (camera) communicable the radio communication terminal (medium) within a predetermined distance. The information appliance (camera) comprises (an image pickup part for obtaining image data by photographing a subject,) a storing part for storing information peculiar to a user of the information appliance (camera), a radio communication part (medium reading part) (transmitting a predetermined radio signal and) reading information from the radio communication terminal (medium), and an authorization part for authorizing the information appliance (camera) user by collating information from the radio communication terminal read at the radio communication part (medium reading part) with information peculiar to the information appliance (camera) user stored in the storing part (and a record part for recording the information related to the camera user authorized at the authorization part while relating the information related to the camera user authorized at the authorization part to the image data photographed at the image pickup part). The radio communication terminal (medium) comprises a storing part for storing predetermined information and a transmission part for receiving a radio signal generated at the information appliance (the predetermined radio signal generated at a radio communication medium reading part of the camera) and transmitting the predetermined signal stored in the storing part as a radio signal.

21 Claims, 12 Drawing Sheets

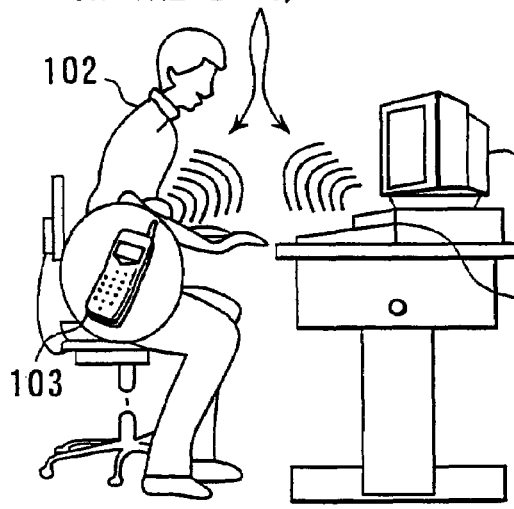

FIG. 1A

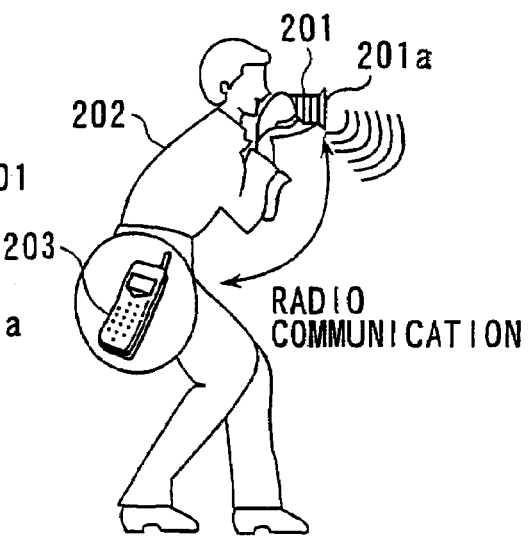

FIG. 1B

```
PROCESSING IN SIDE                PROCESSING IN SIDE
OF PORTABLE                       OF INFORMATION
COMMUNICATION                     APPLIANCE
TERMINAL
                                  TRANSMITTING INFORMATION
USER (PORTABLE    <----------     READOUT REQUEST
COMMUNICATION
TERMINAL)                         TRANSMITTING INFORMATION
APPROACHES       <----------      READOUT REQUEST
INFORMATION
APPLIANCE                         TRANSMITTING INFORMATION
                 <----------      READOUT REQUEST

TRANSMITTING INFORMATION
        RECEIVING <----------     READOUT REQUEST
TRANSMITTING
INFORMATION
APPLIANCE                         RECEIVING
USER'S OWN
INFORMATION                       COLLATING
(TELEPHONE
 NUMBER)                          ALLOWING USE OR
                                  PEJECTING USE
                                  PROCESSING
      (TIME BASE)                     (TIME BASE)
```

FIG. 1C

| USER ID | CAMERA USER'S OWN INFORMATION (AUTHORIZATION INFORMATION) |
|---|---|
| 1 | 19dle9awkf |
| 2 | z2tnfower;3 |
| 3 | Yzev8&fd2 |
| ⋮ | |
| n | $ekfg9sde3 |

EXAMPLE OF LIST IN CAMERA STORING USER INFORMATION

INFORMATION OF USER ID=1 RECORDED IN NON-CONTACT ID CARD

| USER ID | CAMERA USER'S OWN INFORMATION (AUTHORIZATION INFORMATION) |
|---|---|
| 1 | 19dIe9awkf |
| 2 | z2tnfower;3 |
| 3 | Yzev8&fd2 |
| ⋮ | |
| n | $ekfg9sde3 |

| CAMERA'S SERIAL NUMBER=123456 |
|---|

EXAMPLE OF LIST IN CAMERA STORING USER INFORMATION

| 19dIe9awkf | 1234567 |
|---|---|

INFORMATION OF USER ID=1 RECORDED IN NON-CONTACT ID CARD

| USER'S OWN | CAMERA'S SERIAL NUMBER |
|---|---|
| Ks#die934 | 123456 |

(INFORMATION PECULIAR TO USER USING CAMERA RECORDED IN IC CARD)

| USER ID | CAMERA USER'S OWN INFORMATION (AUTHORIZATION INFORMATION) |
|---|---|
| 1 | 19dle9awkf |
| 2 | z2tnfower;3 |
| 3 | Yzev8&fd2 |
| ⋮ | |
| n | $ekfg9sde3 |

GROUP'S OWN INFORMATION=7654321

EXAMPLE OF LIST IN CAMERA STORING USER INFORMATION

| 19dle9awkf | 7654321 |

INFORMATION OF USER ID=1 RECORDED IN NON-CONTACT ID CARD

INFORMATION PROCESSING SYSTEM AND CAMERA SYSTEM

CROSS-REFERENCE TO RELATED APPLICATIONS

This application is based upon and claims the benefit of priority from the prior Japanese Patent Application No. 11-181599, filed Jun. 28, 1999, the entire contents of which are incorporated herein by reference.

BACKGROUND OF THE INVENTION

The present invention relates to an information processing system and a camera system, and more particularly to an information processing system comprising a radio (or wireless) communication terminal and an information appliance communicable with the radio communication terminal, for example, within a predetermined distance, such as about one meter, and a camera system comprising a radio (or wireless) communication medium and a camera communicable with the radio communication medium within a predetermined distance wherein each information processing system and camera system authorizes an information appliance user and a camera user, or a subject, or both of them.

Conventionally, as methods taking photographer information in an image photographed by means of a camera, the method in which a password is inputted at the time of camera photographing (Jpn. Pat. Appln. KOKAI Publication No. 08-315106) and the method in which biological information, such as fingerprint information, is utilized other than a password (Jpn. Pat. Appln. KOKAI Publication No. 05-127246) have been proposed.

However, in the conventional methods described above, the operation in which a password is actually inputted is not convenient to do by the reasons that the size of a camera equipment body is small and a user interface for inputting a password, such as a keyboard, operation buttons, or a display device, is insufficient as characteristics of a camera as a device.

Although the problem regarding a user interface can be cleared in the method in which biological information is employed, a problem exists in which an analysis means for authorizing a camera user and various kinds of data therefor have to be taken into a camera, thereby resulting in great difficulty in the realization in terms of mounting.

This type of problem is also derived in an information processing system comprising a radio communication terminal and an information appliance communicable with the radio communication terminal, for example, within a predetermined distance, such as about one meter, and a camera system comprising a radio communication medium and a camera communicable with the radio communication medium within a predetermined distance wherein each information processing system and camera system authorizes an information appliance user and a camera user, or a subject, or both of them.

Keeping the point mentioned above in mind, it is a problem of the present invention to propose a method in which a user can perform the process for authorizing an information appliance user and a camera user, or a subject, or both of them through a simple operation and by which mounting in a camera can be easily executed.

BRIEF SUMMARY OF THE INVENTION

The present invention is developed concerning the above mentioned circumstances, and it is an object of the present invention to provide an information processing system comprising a radio communication terminal and an information appliance communicable with the radio communication terminal within a predetermined distance and a camera system comprising a radio communication medium and a camera communicable with the radio communication medium within a predetermined distance wherein each information processing system and camera system authorizes an information appliance user and a camera user, a subject, or both of them.

(1) In order to achieve the above described object, according to one embodiment of the present invention, provided is an information processing system comprising a radio communication terminal and an information appliance communicable with the radio communication terminal within a predetermined distance, the information appliance comprising: a storing part for storing information peculiar to a user of the information appliance; a radio communication part for reading information from the radio communication terminal; and an authorization part for authorizing the user of the information appliance by collating information from the radio communication terminal read at the radio communication part with information peculiar to the user of the information appliance stored in the storing part, and the radio communication terminal comprising a storing part for storing predetermined information and a transmission part for receiving a radio signal transmitted from the information appliance and transmitting the predetermined information stored in the storing part as a radio signal.

(2) In order to achieve the above described object, according to another embodiment of the present invention, provided is a camera system comprising a radio communication medium and a camera communicable with the radio communication medium within a predetermined distance, the camera comprising: an image pickup part for obtaining image data by photographing a subject; a storing part for storing information peculiar to a user of the camera; a radio communication medium reading part for transmitting a predetermined radio signal and reading information from the radio communication medium; an authorization part for authorizing the camera user by collating information read at the radio communication medium reading part with the camera user's own information stored in the storing part; and a record part for recording information related to the camera user authorized at the authorization part while connecting the information related to the camera user with the image data photographed at the image pickup part, and the radio communication medium comprising a storing part for storing predetermined information and a transmission part for receiving the predetermined radio signal transmitted from the radio communication medium reading part of the camera and transmitting the predetermined information stored in the storing part as a radio signal.

(3) Further, in order to achieve the above described object, according to another embodiment of the present invention, provided is a camera system comprising a radio communication medium in the side of a subject and a camera communicable with the radio communication medium within a predetermined distance, the camera comprising: an image pickup part for obtaining image data by photographing the subject; a radio communication medium reading part for transmitting a predetermined radio signal and reading information from the radio communication medium; an information maintenance part for temporarily maintaining information from the radio communication medium of the subject side read at the radio communication medium reading part as information peculiar to the subject; and an information record part for recording, while relating to a file of image data photographed, information peculiar to the subject maintained in the information maintenance part when an image is photographed employing the image pickup part, and the radio communication medium comprising a storing part for storing predetermined information containing the subject's own information and a transmission part for receiving the predetermined radio signal transmitted from the radio communication medium reading part of the camera and transmitting the predetermined information stored in the storing part as a radio signal.

(4) Furthermore, in order to achieve the above described object, according to another embodiment of the present invention, provided is a camera system comprising a radio communication medium in the side of a camera user, a radio communication medium in the side of a subject, and a camera communicable with each radio communication medium within a predetermined distance, the camera comprising: an image pickup part for obtaining image data by photographing the subject; a storing part for storing in advance information peculiar to the camera user; a subject information acquisition mode setting part for setting the camera to a mode for acquiring information peculiar to the subject; a radio communication medium reading part for transmitting a predetermined radio signal and reading information from each radio communication medium; an authorization part for authorizing the camera user by collating information from the radio communication medium of the camera user side read at the radio communication medium reading part with the camera user's own information stored in the storing part; an information maintenance part for temporarily maintaining information from the radio communication medium of the subject side read at the radio communication medium reading part as information peculiar to the subject; and an information record part for recording, while relating to a file of image data photographed, the subject's own information maintained in the information maintenance part along with information related to the camera user authorized at the authorization part when an image is photographed employing the image pickup part in the case in which the subject information acquisition mode is set employing the subject information acquisition mode setting part, and each the radio communication medium comprising a storing part for storing predetermined information containing the camera user's own information or the subject's own information and a transmission part for receiving the predetermined radio signal transmitted from the radio communication medium reading part of the camera and transmitting the predetermined information stored in the storing part as a radio signal.

(5) Moreover, in order to achieve the above described object, according to another embodiment of the present invention, provided is the camera system of any one of (2) to (4) described above, wherein the camera further comprises: a radio communication medium writing part; a random number generating part; an updating part for updating the camera user's own information stored in the storing part; and a processing part for performing a series of processing in which random numbers generated by the random number generating part are obtained, information based on the random numbers is transmitted to the radio communication medium side for being recorded in the radio communication medium, employing the radio communication medium writing part, and the camera user's own information stored in the storing part is updated, employing the updating part when the camera user is authorized by the authorization part.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A, 1B, 1C are schematic views for explaining an outline of a information processing system according to the first embodiment of the present invention.

DETAILED DESCRIPTION OF THE INVENTION

Figures 2A, 2B:
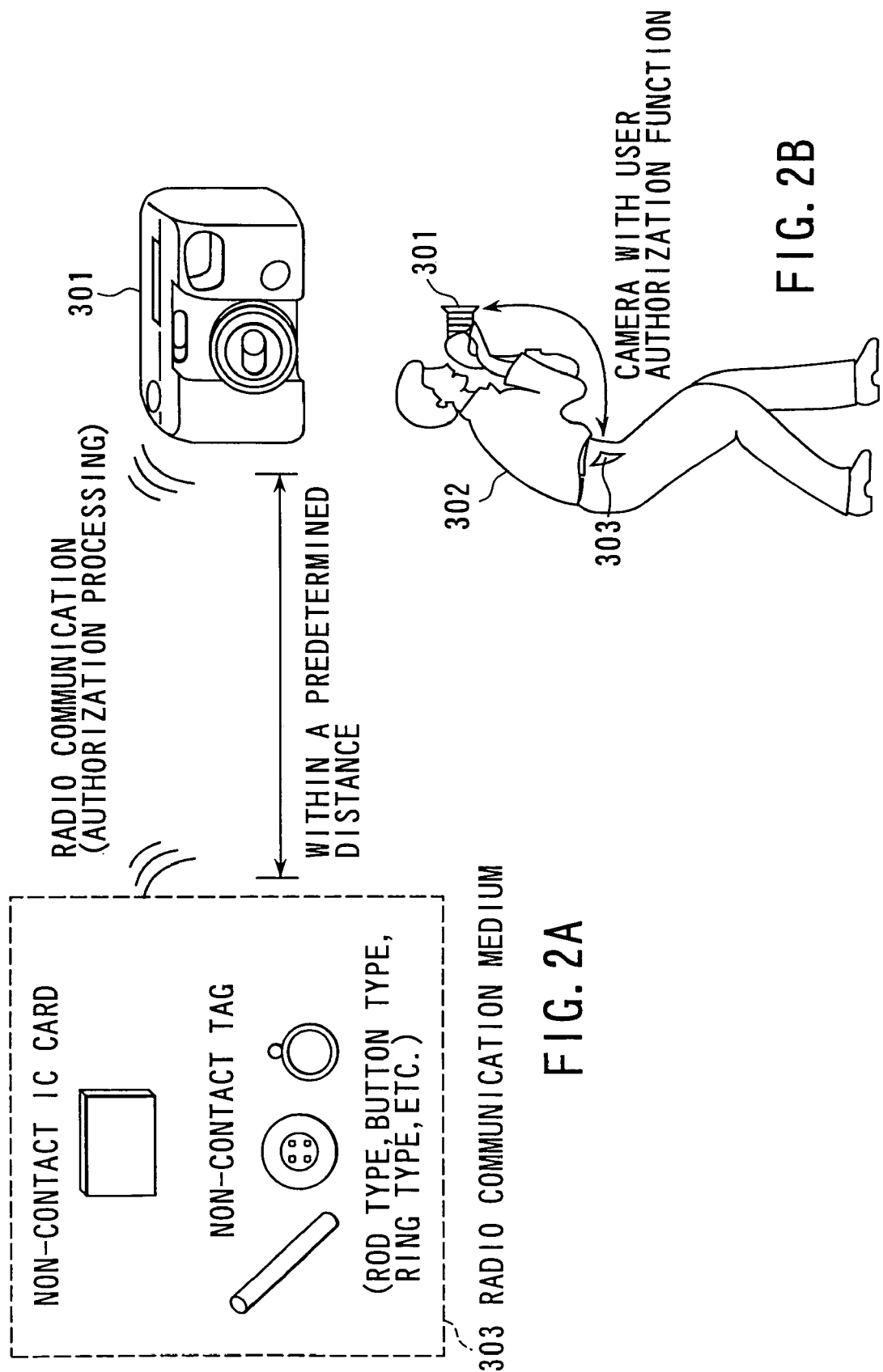
FIGS. 2A, 2B are schematic views for explaining an outline of a camera system according to the second embodiment of the present invention.

Reference will now be made in detail to the presently preferred embodiments of the invention as illustrated in the accompanying drawings, in which like reference numerals designate like or corresponding parts.

In the following, embodiments according to the present invention will be explained referring to drawings.

FIG. 1 is a schematic view for explaining an outline of an information processing system according to the first embodiment of the present invention.

That is, FIG. 1A exemplifies an information processing system 100 performing information processing by a radio communication (e.g., BlueTooth, IrDA employing an infrared ray, PHS/radio wave for a portable telephone or the like) between a transmission/reception part 101a of a radio communication of an information appliance 101, for example, such as a stationary type personal computer (PC), and a radio communication terminal 103 that a user 102 carries.

FIG. 1B exemplifies an information processing system 200 performing information processing by a radio communication between a transmission/reception part 201a of a radio communication of an information appliance 201, for example, such as a camera, and a radio communication terminal 203 that a user 202 carries.

FIG. 1C shows a flow of a performing procedure of the information processing by the information processing system 100 or 200 as described above along a time base.

Suppose that the user 201 or 202 carrying the radio communication terminal 103 or 203 approaches the information appliance 101 or 201 while transmitting an information readout request from the transmission/reception part 101a or 201a of the radio communication is repeated as processing in the side of the information appliance 101 or 201.

Then, as processing in the side of the radio communication terminal 103 or 203, the information readout request is received so as to transmit information appliance user's own information (e.g., a telephone number or the like).

Next, as processing in the side of the information appliance 101 or 201, the information appliance user's own information is received so as to perform a collation process for authorizing whether or not the user 102 or 202 is the true person, and according to the result of the collation process, the process of allowing use or rejecting use of the information appliance 101 or 201 is performed.

FIGS. 2A, 2B are schematic views for explaining an outline of a camera system according to the second embodiment of the present invention.

That is, FIG. 2A exemplifies a camera system 300 performing an authorization processing by a radio communication between a radio communication medium 301, such as a non-contact IC card that a user 302 carries, and a camera 303 with a user authorization function, for example, within a predetermined distance, such as about one meter.

In this case, there are a rod type, a button type, a ring type, or the like as a non-contact tag of the radio communication medium 301 other than the non-contact IC card.

FIG. 2B exemplifies the case in which the user 302 carries the radio communication medium 301, such as the non-contact IC card, in the state in which the user 302 puts the radio communication medium in his wallet inside his pocket of trousers. However, carrying condition is not limited to this, and the user 302 may stores the radio communication medium 301 by a non-contact tag or the like on a button of clothing, a ring, a necktie pin, or the like.

First Embodiment

The information processing system according to the first embodiment of the present invention will be explained using FIG. 3.

In each drawings described below, the parts allotted to like reference numerals have like functions.

Figure 3:
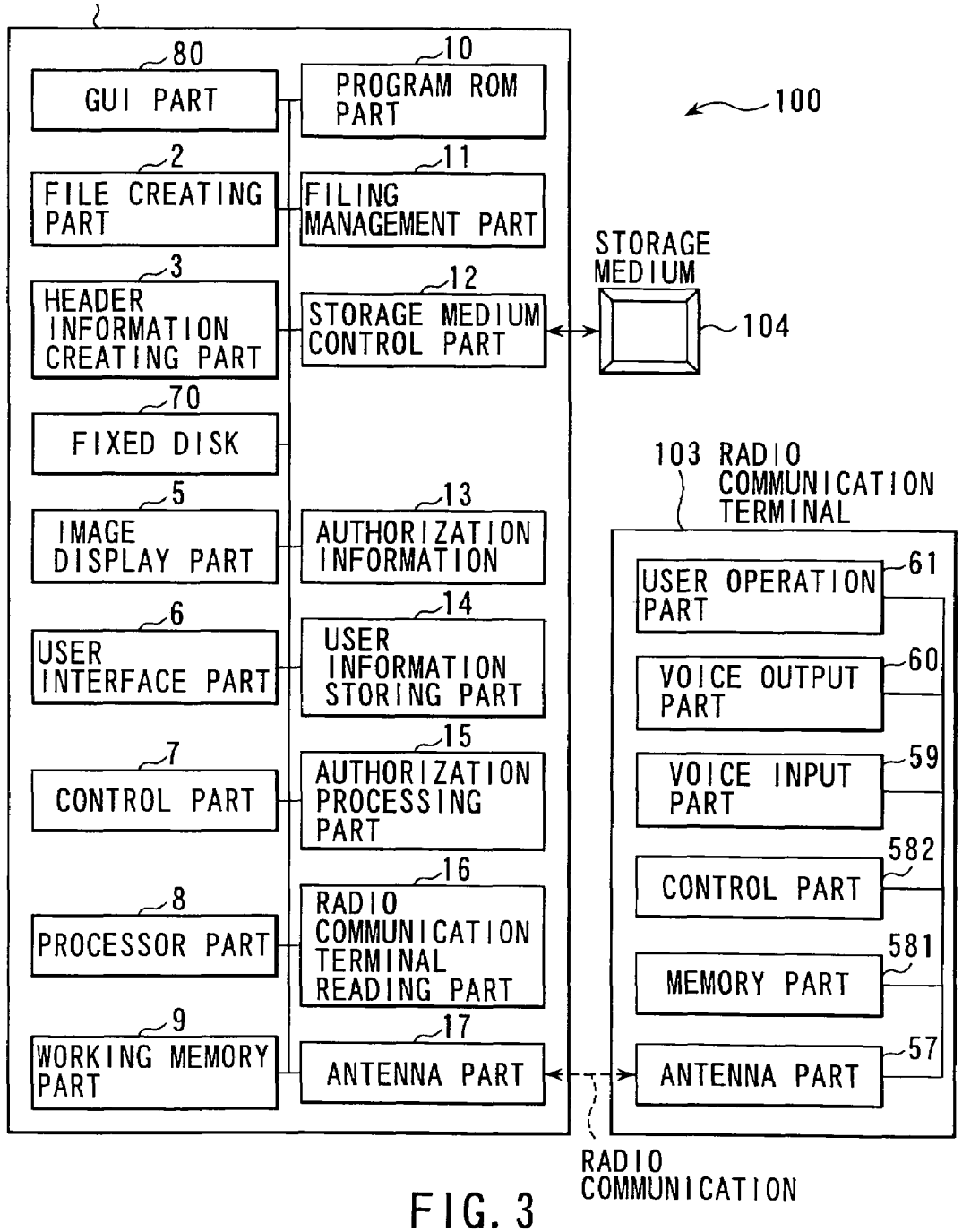
FIG. 3 is a block diagram showing a constitution of the information processing system according to the first embodiment of the present invention.

FIG. 3 is a block diagram showing a constitution of the information processing system according to the first embodiment of the present invention.

That is, the information processing system 100 is constituted of the information appliance 101, a storage medium 104 of an outer part, and the radio communication terminal 103 radio communicating with the information appliance 101.

The radio communication between the information appliance 101 and the radio communication terminal 103 is performed via each antenna part 17 and 57.

The information appliance 101 is constituted of a GUI part 80, a file creating part 2, a header information creating part 3, a fixed disk 70, an image display part 5, a user interface part 6, a control part 7, a processor part 8, a working memory part 9, a program ROM part 10, a filing management part 11, a storage medium control part 12, an authorization information part 13, a user information storing part 14, an authorization processing part 15, and a radio communication terminal reading part 16, each connected to the antenna part 17 via an internal bus.

The radio communication terminal 103 is constituted of a memory part 581, a control part 582, a voice input part 59, a voice output part 60, and a user operation part 61, each connected to the antenna part 57 via an internal bus.

In this case, in order to enable radio communication between the information appliance 101 and the radio communication terminal 103 within a predetermined distance, such as about one meter, a communicable distance can be adjusted by, for example, a method employing a standard, such as BlueTooth employing 2.45 GHz band, that is a microwave, or IrDA employing an infrared ray.

The working memory part 9 is a memory for buffering the data transmitted from the radio communication terminal reading part 16 or the like via the antenna part 17 and the data in a halfway step of every kind of processing and loading a program stored in the program ROM part 10.

The control part 7 is a part controlling an entire processing of the information appliance 101.

That is, according to the constitution of the information processing system 100, provided is the information processing system characterized in that said system comprising the radio communication terminal 103 and the information appliance 101 communicable with the radio communication terminal, for example, within a predetermined distance, such as about one meter, wherein the information appliance 101 comprises the user information storing part 14 as a storing part storing the information appliance user's own information, the antenna part 17 and the radio communication terminal reading part 16 as a radio communication part for reading information from the radio communication terminal 103, and the authorization information part 13 and the authorization processing part 15 as an authorization part for authorizing the user by collating information from the radio communication terminal 103 read at the antenna part 17 and the radio communication terminal reading part 16 as the radio communication part with the information appliance user's own information stored in the user information storing part 14 as the storing part, and radio communication terminal 103 comprises the memory part 581 as a storing part for storing predetermined information and the antenna part 57 and the control part 582 as a transmission part for receiving a radio signal transmitted from the information appliance 101 and transmitting the predetermined information stored in the memory part 581 as the storing part as a radio signal.

By the information processing system 100 like the above, information processing can be performed through a flow of the procedure as shown in FIG. 1A.

Suppose that the user 201 or 202 carrying the radio communication terminal 103 approaches the information appliance 101 while transmitting the information readout request from the antenna part 17 as the transmission/reception part 101a of the radio communication is repeated as processing in the side of the information appliance 101.

Then, as processing in the side of the radio communication terminal 103, the information readout request is received at the antenna part 57 so as to read and transmit predetermined information of the information appliance user's own information (e.g., a telephone number or the like) from the memory part 581 as the storing part for storing the predetermined information of the information appliance user's own information (e.g., a telephone number or the like) by control of the control part 582.

Next, as processing in the side of the information appliance 101, by the processing of the authorization information part 13 and the authorization processing part 15 as the authorization part for authorizing the user by collating the information from the radio communication terminal 103 read at the antenna part 17 and the radio communication terminal reading part 16 as the radio communication part with the information appliance user's own information stored in the user information storing part 14 as the storing part, the information appliance user's own information is received so as to perform a collation process for authorizing whether or not the user 102 is the true person, and according to the result of the collation process, the process of allowing use or rejecting use of the information appliance 101 is performed.

In a concrete information processing system, in a user authorization system employing a portable telephone, a PHS, or the like, a telephone number is used as the user's own information.

That is, characterized is that the radio communication terminal may be a portable telephone, the information appliance user's own information may be a telephone number, the telephone number differs for each user, and that the portable telephone hereafter can be a part for specifying an individual is utilized.

In a concrete information processing system, when a camera or the like as an information appliance is concerned, since there is, of course, no key board, a mouse, or the like, inputting a code number is difficult if only a camera is used. Thus, the code number is inputted by employing push buttons of the portable telephone, and further by using a communication function.

That is, the radio communication terminal is characterized in that the code number, in addition to the information appliance user's own information, is transmitted, employing an operation part (push buttons or the like) of the portable telephone.

According to a concrete example of an information processing system according to the first embodiment of the present invention described above, provided is a information processing system characterized in that the radio communication terminal reading part 16 as the radio communication terminal reading part of the information appliance 101 has a means by which a directivity of an electromagnetic wave transmitted is made high.

Through the information processing system like this, a misoperation, such as a response of the radio communication terminal 103 of an adjacent person, can be prevented by making the electromagnetic wave transmitted in a predetermined direction without spread in various directions by making the directivity of the electromagnetic wave transmitted by the radio communication terminal reading part 16 as the radio communication terminal reading part high.

Second Embodiment

Next, a camera system according to the second embodiment of the present invention will be explained employing FIGS. 4 to 9A, 9B.

In each drawings described below, the parts allotted to like reference numerals have like functions.

Figure 4:
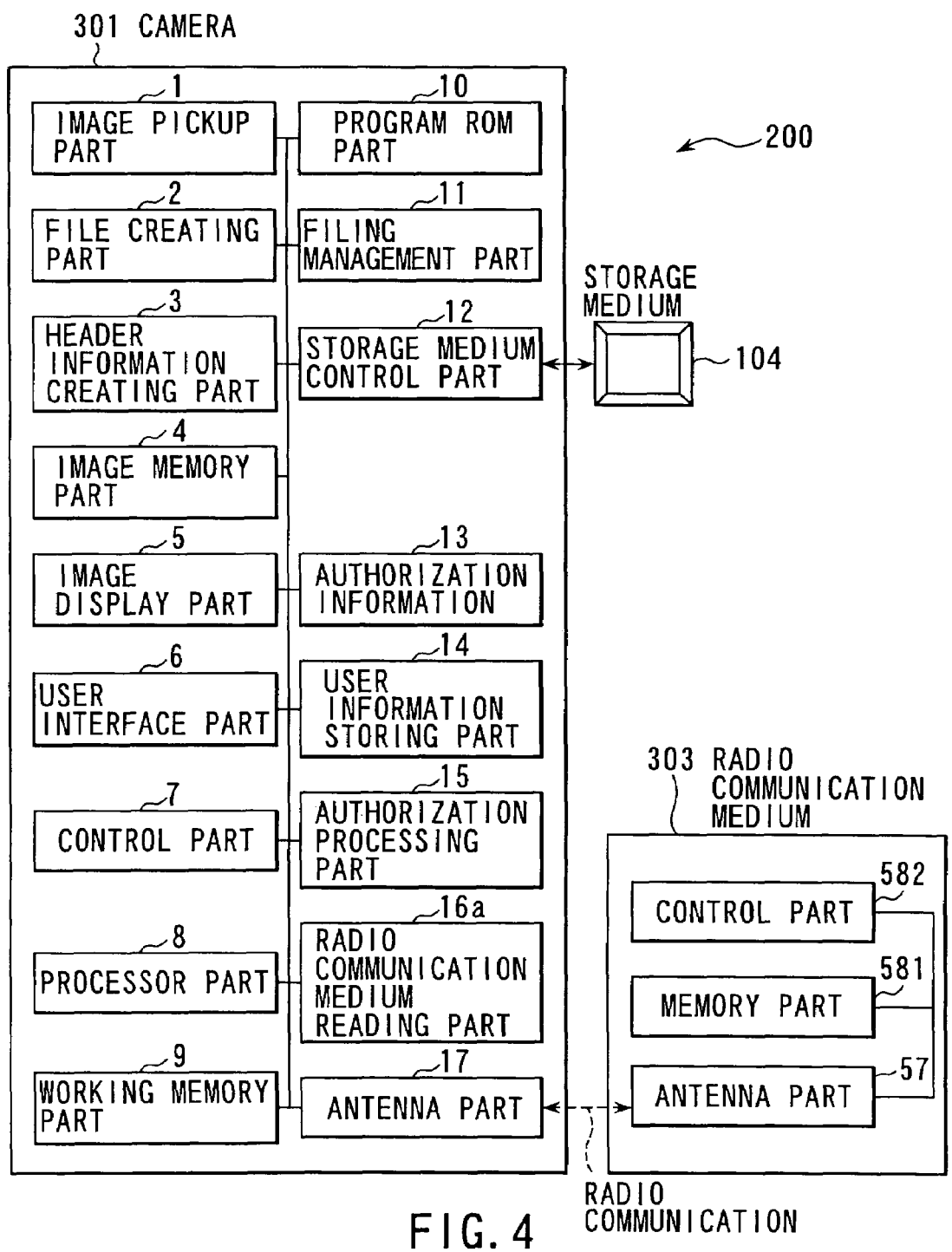
FIG. 4 is a block diagram showing the constitution of a first concrete example of a camera system according to the second embodiment of the present invention.

FIG. 4 is a block diagram showing the constitution of a first concrete example of the camera system according to the second embodiment of the present invention.

That is, this camera system 300 is constituted of the camera 301, the storage medium 104 of the outer part, and the radio communication medium 303 radio communicating with the camera 301.

Radio communication between the camera 301 and the radio communication medium 303 is performed via each antenna part 17 and 57.

The camera 301 is constituted of an image pickup part 1, the file creating part 2, the header information creating part 3, an image memory part 4, the image display part 5, the user interface part 6, the control part 7, the processor part 8, the working memory part 9, the program ROM part 10, the filing management part 11, the storage medium control part 12, the authorization information part 13, the user information storing part 14, the authorization processing part 15, and a radio communication medium reading part 16a, each connected to the antenna part 17 via an internal bus.

The radio communication medium 303 is constituted of the memory part 581 and the control part 582, each connected to the antenna part 57 via an internal bus.

In this case, in order to enable radio communication between the camera 301 and the radio communication medium 303 within a predetermined distance, such as about one meter, there is a method employing a non-contact IC (e.g., ISO/IEC14443 or ISO/IEC15693) employing a long wavelength band or the frequency band of 13.56 MHz, or a standard, such as BlueTooth employing 2.45 GHz band, that is a micro wave, or IrDA employing an infrared ray.

In the case of the non-contact IC utilizing an electromagnetic induction, in the method in which a standard, such as BlueTooth employing 2.45 GHz band, that is a micro wave, or IrDA employing an infrared ray, is employed, the communicable distance can be adjusted by also making the number of turns of a coil of communication antenna of a part where the information of the radio communication medium (terminal) is read and written an appropriate number.

The working memory part 9 is a memory for buffering data transmitted from the radio communication terminal reading part 16 or the like via the antenna part 17 and data in a halfway step of every kind of processing and loading a program stored in the program ROM part 10.

The control part 7 is a part for controlling an entire processing of the camera 301.

That is, according to the constitution of the camera system 300, provided is the camera system characterized in that said system comprises a radio communication medium 303 and the camera 301 communicable with the radio communication medium 303, for example, within a predetermined distance, such as about one meter, wherein the camera 301 comprises the image pickup part 1 for obtaining image data by photographing a subject, the user information storing part 14 as a storing part for storing in advance the camera user's own information, the radio communication medium reading part 16a for transmitting a predetermined radio signal via the antenna part 17 and reading information from the radio communication medium 301 via the antenna part 17, the authorization information part 13 and the authorization processing part 15 as an authorization part for authorizing the camera user by collating information read at the radio communication medium reading part 16a with the camera user's own information stored in the user information storing part 14 as the storing part, and the control part 7 and the image memory part 4 as a record part for recording information related to the camera user authorized at the authorization information part 13 and the authorization processing part 15 as the authorization part while connecting the information related to the camera user with the image data photographed at the image pickup part 1, and radio communication medium 303 comprises the memory part 581 as a storing part for storing predetermined information and the antenna part 57 and the control part 582 as a transmission part for receiving the predetermined radio signal transmitted from the radio communication medium reading part 16a and the antenna part 17 of the camera 301 and transmitting the predetermined information stored in the memory part 581 as the storing part as a radio signal.

By the camera system 300 like the above, information processing can be performed through a flow of the procedure as shown in FIG. 1C.

Suppose that while transmitting the information readout request from the antenna part 17 as the transmission/reception part of the radio communication is repeated as processing in the side of the camera 301, the information readout request is received at the radio communication medium terminal 303 that the user 202 of the camera 301 carries.

Then, as processing in the side of the radio communication medium 303, the information readout request is received at the antenna part 57 so as to read and transmit predetermined information of the camera user's own information from the memory part 581 as the storing part for storing the predetermined information of the camera user's own information by control of the control part 582.

Next, as processing in the side of the camera 301, by the processing of the authorization information part 13 and the authorization processing part 15 as the authorization part for authorizing the camera user by collating the information from the radio communication medium 303 read at the radio communication medium reading part 16 via the antenna part 17 as the transmission/reception part of the radio communication with the camera user's own information stored in the user information storing part 14 as the storing part, the information of the camera user's own information is received so as to perform a collation process for authorizing whether or not the user 202 is the true person, and according to the result of the collation process, the process of allowing use or rejecting use of the camera 301 is performed.

When the user 202 is authorized as the true person at the authorization information part 13 and the authorization processing part 15 as the authorization part, the information related to the camera user is recorded in the image memory part 4 for recording the camera user's related information while connecting it with the image data photographed at the image pickup part 1 by the control of the control part 7 as processing of allowing use of the camera 301.

Figures 5A, 5B:
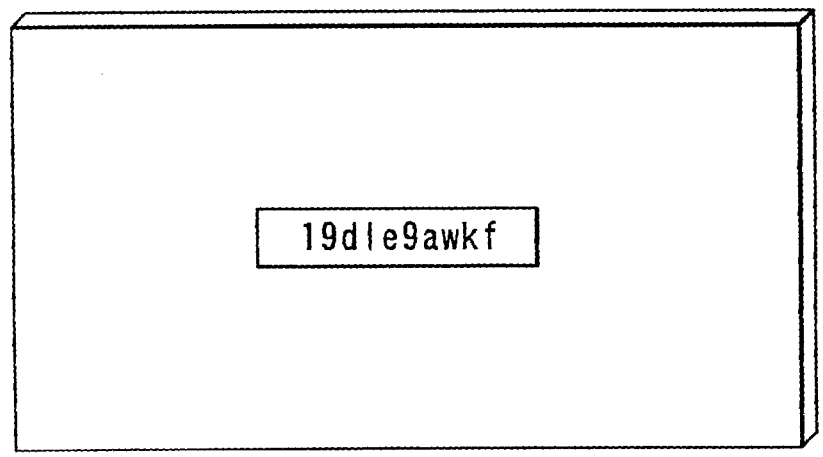
FIG. 5A is a view showing an example of a camera user's own information list stored in a user information storing part 14 of the side of a camera 301 of a camera system according to the second embodiment of the present invention.
FIG. 5B is a view showing an example of the camera user's own authorization information of the user ID=1 of FIG. 5A stored in a non-contact IC card as a radio communication medium 303.

FIG. 5A is a view showing an example of a camera user's own information list stored in the user information storing part 14 of the camera 301 side.

That is, in this example, the camera user's own information (authorization information: 19dle9awkf, z2tnfower;3, Yzev8&fd2, $ekfg9sde3) is stored corresponding to the users IDs (1, 2, 3, . . . n).

FIG. 5B is a view showing an example of the camera user's own authorization information of the user ID=1 of FIG. 5A, 19dle9awkf, recorded in a non-contact IC card as the radio communication medium 303.

Figure 6:
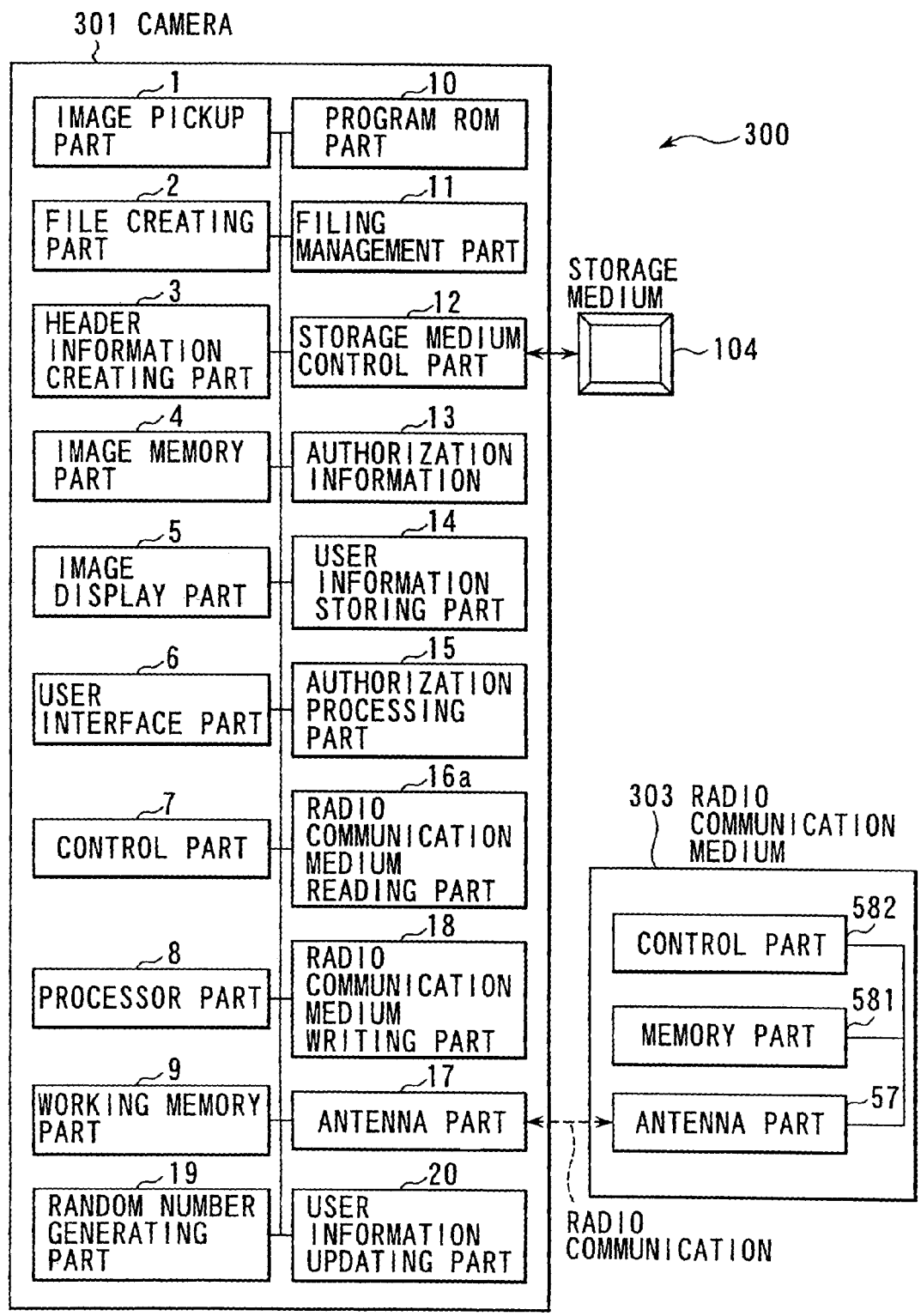
FIG. 6 is a block diagram showing the constitution of a second concrete example of a camera system according to the second embodiment of the present invention.

FIG. 6 is a block diagram showing the constitution of a second concrete example of the camera system according to the second embodiment of the present invention.

That is, this camera system 300 is constituted of the camera 301, the storage medium 104 of the outer part, and the radio communication medium 303 radio communicating with the camera 301.

The radio communication between the camera 301 and the radio communication medium 303 is performed via each antenna part 17 and 57.

The camera 301 is constituted of an image pickup part 1, the file creating part 2, the header information creating part 3, the image memory part 4, the image display part 5, the user interface part 6, the control part 7, the processor part 8, the working memory part 9, the program ROM part 10, the filing management part 11, the storage medium control part 12, the authorization information part 13, the user information storing part 14, the authorization processing part 15, and the radio communication medium reading part 16a, a radio communication medium writing part 18, a random number generating part 19, and a user information updating part 20, each connected to the antenna part 17 via an internal bus.

The radio communication medium 303 is constituted of the memory part 581 and the control part 582, each connected to the antenna part 57 via an internal bus.

The second concrete example of the camera system is different in that the radio communication writing part 18, the random number generating part 19, and the user information updating part 20 are added to the first concrete example of the camera system mentioned above.

That is, according to the second concrete example of the camera system, provided is a camera system characterized in that in the first concrete example of the camera system described above, the camera 301 further comprises the radio communication medium writing part 18 as a radio communication medium writing part, the random number generating part 19 as a random number generating part, the user information updating part 20 as an updating part for updating the information recorded in the user information storing part 14 as a storing part for storing the camera user's own information, and the control part 7 as a processing part for performing a series of processing in which random numbers generated by the random number generating part 19 as the random number generating part are obtained, information based on the random numbers is transmitted to the side of the radio communication medium 303 for being recorded in the radio communication medium 303 via the antenna part 17, employing the radio communication medium writing part 18 as the radio communication medium writing part, and the camera user's own information recorded in the user information storing part 14 as the storing part for storing the camera user's own information is updated, employing the user information updating part 20 as the updating part when the user 202 is authorized as the true person by the authorization information part 13 and the authorization processing part 15 as the authorization part.

Figure 7:
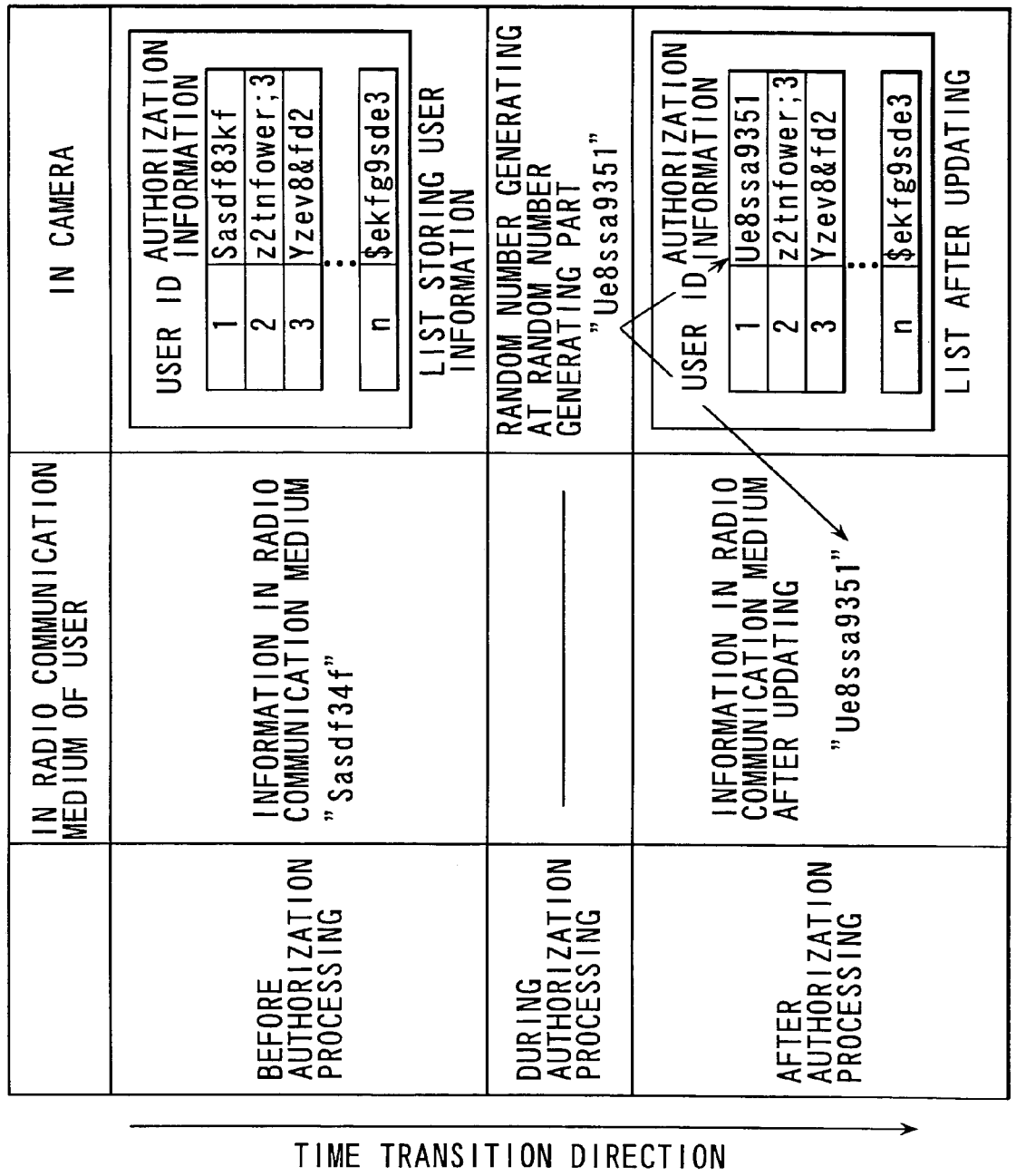
FIG. 7 is a view diagrammatically showing a series of processing flow of the second concrete example of the camera system according to the second embodiment of the present invention.

FIG. 7 is a view diagrammatically showing a series of processing flow of the second concrete example of this camera system.

That is, before authorization processing, the camera user's own information (authorization information: Sasdf834kf, z2tnfower;3, Yzev8&fd2, $ekfg9sde3) is stored corresponding to the users IDs (1, 2, 3, . . . n) in the user information storing part 14 of the camera 301 side as one example of a camera user's own information list, and the camera user's own authorization information of the user ID=1, Sasdf834kf, is recorded in the radio communication medium 303 that the user carries.

During the process of authorization processing, random numbers, "Ue8ssa9351" is generated by the random number generating part 19 in the side of the camera 301.

After the authorization processing, "Ue8ssa9351" corresponding to the random numbers generated by the random number generating part 19 of the side of the camera 301 is recorded as information after updating in the radio communication medium 303, and a list in which the user ID=1 in the camera user's own information list is updated to "Ue8ssa9351" is stored in the user information storing part 14 in the side of the camera 301.

In the second concrete example of the camera system according to the second embodiment of the present invention, security can be improved through a so-called one time password like method by changing the camera user's own information as a password (information) every time the camera 301 is used.

Although the case in which the so-called one time password like means is employed is explained in order to improve the security since the IC card in which a CPU is not provided is supposed in the present embodiment, in the case of employing the IC card in which a CPU is provided, e.g., a Smart IC card with a code number processor, a means for improving security, such as a challenge response method which has performed in a information processing system which generally aims at an improvement in security, can be applied by providing a code number processing part even in a camera.

According to the first and the second concrete examples of the camera system according to the second embodiment of the present invention described above, provided is the camera system characterized in that the camera 301 comprises the user interface part 6 as an input part by which the camera user requires that the authorization processing of the camera user is started and the control part 7 as a control part for supplying power to the radio communication medium reading part 16a as the radio communication medium reading part when the authorization processing of the camera user is required through the user interface part 6 as the input part so that the process for authorizing the camera user is performed through the method described in the first and the second concrete embodiments of the camera system according to the second embodiment of the present invention described above and finishing supplying power to the radio communication medium reading part 16a as the radio communication medium reading part after a predetermined time passes.

Through this camera system, in the case in which the radio communication medium 303 is a non-contact IC card, consumption reduction of a battery power supply and energy saving can be attempted by supplying power to the camera 301 with a non-contact IC card reader function part only at the time of authorizing the camera user so as to usually.

That is, if the camera with the non-contact IC card reader function part is set so that electromagnetic wave is always radiated/detected, in the case in which the non-contact IC card reader function part like this is mounted on the camera, there is a necessity that power is always turned on, thereby causing a large amount of power consumption which is a problem.

Therefore, as described above, in the present camera system, only when the user employing the camera 301 pushes the button of an operation requirement that requires authorization processing, power is temporarily supplied to the non-contact IC card reader function part.

In this case, various types of timing may be considered as the operation requiring the authorization processing. For example, power is supplied to the non-contact IC card reader function part for only a second immediately after the power-on of the camera 301, and if the user cannot be authorized during this period of time, authorization may be considered as a failure.

Considered as other timing are that power is supplied to the non-contact IC card reader function part so as to perform the authorization processing when a shutter of the image pickup part 1 of the camera 301 is pressed, or a button or the like only for authorization is provided in the camera, and power is supplied to the non-contact IC card reader function part so as to perform the authorization processing when the button is pushed, or the like.

According to the first and the second concrete examples of the camera system according to the second embodiment of the present invention described above, provided is a camera system characterized in that the camera 301 comprises the image memory part 4 as a record part for creating and recording at the header information creating part 3 information showing that the camera user is unclear on a header part of image data photographed at the image pickup part 1 of the camera 301 when authorization of the camera user by the authorization processing-part 15 is failed.

By the camera system like the above, even when authorization of the camera user is failed, photo-graphing itself of a picture or the like by means of the image pickup part 1 is possible.

In this case, since photographing parson information is not added on the image data obtained by the image pickup part 1, that the photographing is of the case in which authorization of the camera user is failed is recognized.

According to the first and the second concrete examples of the camera system according to the second embodiment of the present invention described above, provided is a camera system characterized in that the camera 301 comprises the control part 7 as a control part for controlling so that photographing using the camera 301 is not performed until authorization of the camera user succeeds by the authorization processing part 15.

By the camera system like this, when authorization is failed, since photographing using the camera 301 cannot be executed, photographing by a wrong camera user cannot be executed.

According to the first and the second concrete examples of the camera system according to the second embodiment of the present invention described above, provided is a camera system characterized in that the camera 301 comprises the authorization information part 13 as an entry processing and entry cancellation processing part of the camera user and the control part 7 as a control part for controlling so that entry processing and entry cancellation processing can be performed by the authorization information part 13 as the entry processing and entry cancellation processing part of the camera user only when a predetermined camera user is authorized by the authorization processing part 15.

By the camera system like this, in the case in which the radio communication medium 303 is the non-contact IC card, a so-called non-contact IC card for a system manager is prepared, and it can be made that user entry/deletion processing or the like cannot be executed other than by the system manager.

In this case, substantially, in the manager side, the mode in which allowing/rejecting use of the camera is determined according to success/failure of authorization of the camera user can be chosen.

According to the first and the second concrete examples of the camera system according to the second embodiment of the present invention described above, provided is a camera system characterized in that the camera 301 comprises the user interface part 6 as a switching part for selectively switching a first mode in which information showing that the camera user is unclear on a header part of image data photographed at the image pickup part 1 of the camera 301 is created at the header information creating part 3 and recorded in the image memory part 4 as the record part when authorization of the camera user by the authorization processing part 15 is failed and a second mode in which control is executed by the control part 7 as the control part so that photographing using the camera 301 is not performed until authorization of the camera user by the authorization processing part 15 succeeds.

By the camera system like this, either of the first mode or the second mode in which allowing/rejecting use of the camera is determined according to success/failure of authorization of the camera user can be chosen in the user side (or the manager side).

According to the first and the second concrete examples of the camera system according to the second embodiment of the present invention described above, provided is a camera system characterized in that the camera system 300 contains information peculiar to the camera 301 as the camera user's own information stored in the radio communication medium 303, and the camera 301 contains the information peculiar to the camera 301 as information stored in the user information storing part 14 as the storing part for storing the camera user's own information.

By the camera system like this, in the case in which the radio communication medium 303 is the non-contact IC card, in order to avoid batting with other camera's user entry information (the information peculiar to the user using the camera), each camera individually can be managed by recording also information peculiar to the camera to be registered (e.g., camera's serial number) as information recorded in the non-contact IC card.

Figures 8A, 8B, 8C:
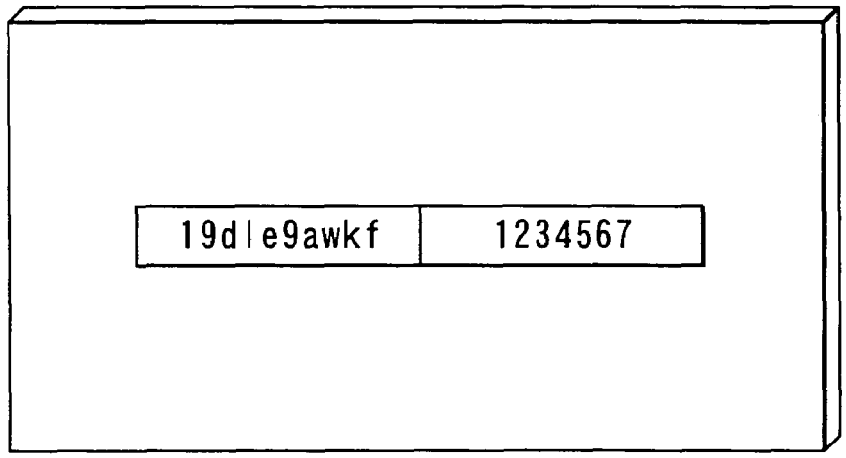
FIG. 8A is a view showing an example of a camera user's own information list stored in the user information storing part 14 of the camera 301 side and a camera's serial number corresponding to the camera user's own information of a camera system according to the second embodiment of the present invention.
FIG. 8B is a view showing an example of the serial number of the camera corresponding to the camera user's own information of the user ID=1 of FIG. 8A recorded in the non-contact IC card as the radio communication medium 303.
FIG. 8C is a view showing an example of the serial number of the camera corresponding to the camera user's own information stored in the non-contact IC card.

FIG. 8A is a view showing an example of the camera user's own information list stored in the user information storing part 14 of the side of the camera 301 and a camera's serial number corresponding to the camera user's own information of a camera system according to the second embodiment of the present invention.

FIG. 8B is a view showing an example of the serial number of the camera corresponding to the camera user's own information of the user ID=1 of FIG. 8A recorded in the non-contact IC card as the radio communication medium 303.

In this case, as shown in FIG. 8C, if the camera serial number (123456) part is used for authorization as information peculiar to the camera to be registered corresponding to the camera user's own information (Ks#die934), each camera individually can be managed. However, if the serial number part is not used for authorization, one non-contact IC card can be used for authorization in a plurality of cameras.

According to the first and the second concrete examples of the camera system according to the second embodiment of the present invention described above, provided is a camera system characterized in that the camera system 300 contains information peculiar to a group jointly using the camera 301 as the camera user's own information stored in the radio communication medium 303, and the camera 301 contains the information peculiar to the group jointly using the camera 301 as information stored in the user information storing part 14 as the storing part for storing the camera user's own information.

By the camera system like this, setting a so-called sharing group becomes possible by expanding information peculiar to a user who uses a camera, and a camera (or a plurality of cameras) can be used by a plurality of users of the sharing group.

Figures 9A, 9B:
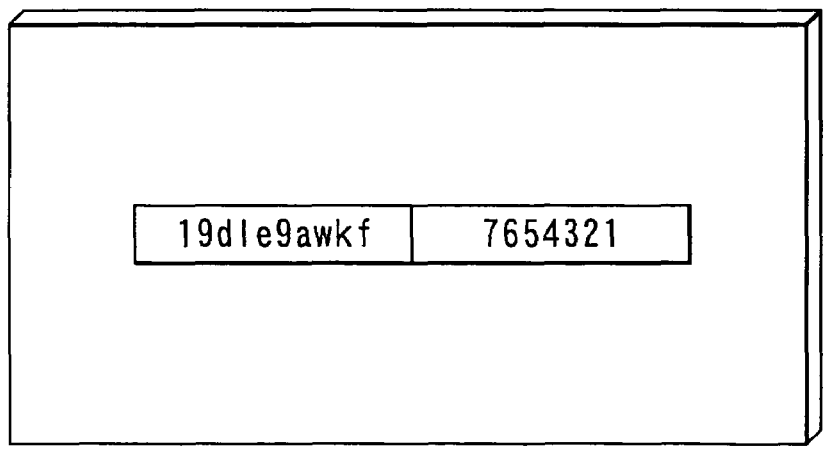
FIG. 9A is a view showing an example of a camera user's own information list stored in the user information storing part 14 of the camera 301 side and group's own information corresponding to the camera user's own information of a camera system according to the second embodiment of the present invention.
FIG. 9B is a view showing an example of the group's own information corresponding to the camera user's own information of the user ID=1 of FIG. 9A recorded in the non-contact IC card as the radio communication medium 303.

FIG. 9A is a view showing an example of a camera user's own information list stored in the user information storing part 14 in the side of the camera 301 of a camera system according to the second embodiment of the present invention and group's own information corresponding to the camera user's own information.

FIG. 9B is a view showing an example of the group's own information corresponding to the camera user's own information of the user ID=1 of FIG. 9A recorded in the non-contact IC card as the radio communication medium 303.

According to the first and the second concrete examples of the camera system according to the second embodiment of the present invention described above, provided is a camera system characterized in that the camera 301 comprises the control part 7 as a control part for controlling so that when a part of information peculiar to a group using the camera coincides by collating information read at the radio communication medium reading part 16a as the radio communication medium reading part with the camera user's own information stored in the user information storing part 14 as the storing part for storing the camera user's own information in the authorization processing part, photographing using the camera becomes possible, and when it does not coincide, photographing using the camera is prohibited.

By the camera system like this, at the time of authorizing a user, only when information peculiar to the group in the information peculiar to the user using the camera coincides, the camera can be used (photographing becomes possible), thereby improving convenience for a gust user.

In this case, if a part other than the information peculiar to the group in the information peculiar to the user using the camera (i.e., information peculiar to a specific user using the camera) does not coincide, information showing that the photographer is not clear is recorded on the header of the image data as described above.

According to the first and the second concrete examples of the camera system according to the second embodiment of the present invention described above, provided is a camera system characterized in that the camera 301 comprises a control part for controlling so that the directivity of the electromagnetic wave transmitted from the radio communication medium reading part 16a as the radio communication medium reading part becomes high.

By the camera system like this, by making the directivity of the electromagnetic wave transmitted from the radio communication medium reading part 16a as the radio communication medium reading part high so that the electromagnetic wave does not spread in various directions and transmits in a specific direction, a misoperation, such as a response of the radio communication medium 303 of an adjacent person, can be prevented.

Third Embodiment

Next, a camera system according to the third embodiment of the present invention will be explained employing FIGS. 10 to 12.

Figure 10:
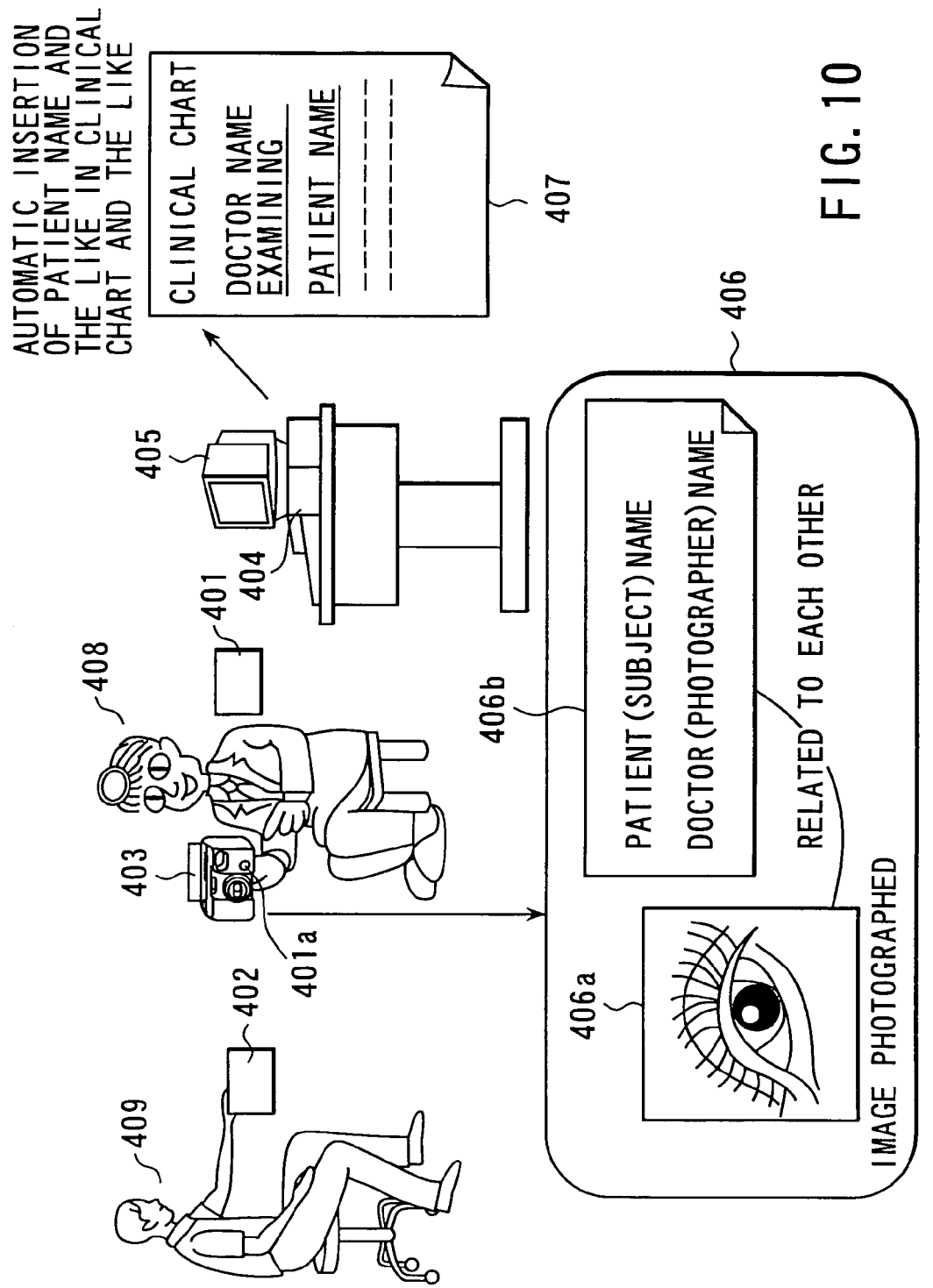
FIG. 10 is a schematic view for explaining an outline of a camera system according to the third embodiment of the present invention.

FIG. 10 is a schematic view for explaining an outline of a camera system according to the third embodiment.

This camera system according to the third embodiment shown in FIG. 10 is made supposing a medical examination authorization system applied when a doctor examines a patient at a hospital or the like.

FIG. 10 shows an example in which at the time of photographing employing a camera 403 with a user authorization function by a radio communication and a subject information acquisition function, the doctor as a camera photographer 408 has the photographer authorized by holing a non-contact IC card/tag 401 which he owns to a camera 403. Then, he switches to a subject information acquisition mode by means of a subject information acquisition mode set button 403a or the like attached to the camera 403. A non-contact IC card/tag 402, such as a patient's registration card in which information peculiar to the patient as the subject 409 is recorded, that the patient as a subject 409 owns, is held to the camera 403 so that an image 406a photographed by the camera 403 in connection with distinguishment information 406b of the camera photographer 408 along with the subject 409 is recorded as an image file 406.

A doctor or a medical consulting engineer or the like is supposed as the photographer 408, who carries the non-contact IC card 401 for authorization of himself.

In this example, this non-contact IC card 401 works also as an access card to an in-hospital information system not shown in the drawing, and a doctor can access the data base of the in-hospital information system and the like, using this card.

The patient as the subject 409 can have a non-contact IC card/tag 402 peculiar to each patient.

This non-contact IC card/tag 402 may serve as a patient's registration card issued at each hospital.

The doctor as the photographer 408 holds the IC card 401 to the camera 403 in order to authorize himself first when photographing the patient as the subject 409.

Then, the doctor as the photographer 408 switches to the subject information acquisition mode by means of the subject information acquisition mode set button 403a or the like attached to the camera 403 and has the patient hold the IC card 402 of the patient 409 as the subject to the camera 403.

In the image file 406 photographed, the information 406b containing doctor's information and patient's information as shown in the drawing is added to the image 406a photographed.

In this case, as methods for adding information, information may be recorded on a header of a file, such as JPEG, or TIFF, or may be recorded in the image 406a as a digital watermark.

Further, as another method of adding information, information may be stored and managed in a different file from an image file related to the image file 406.

By these kinds of methods, managing the image file 406 becomes easy for the doctor as the photographer 408 later, and further an accident in which an image of the subject 409 as a patient is taken by mistake for a diagnosis can be prevented.

Moreover, the non-contact IC card 402 of the subject 409 as the patient, for example, can be employed for inputting the name of the patient in a clinical chart 407 without mistake by holding it to an information terminal 405 at the time of creating the clinical chart, or can be utilized for a delivery of a medicine or a confirmation of a patient at the time of operation.

In the explanation described above, although the patient as the subject 409, that is, a human, is exemplified, the subject is not necessary to be a human.

Figure 11:
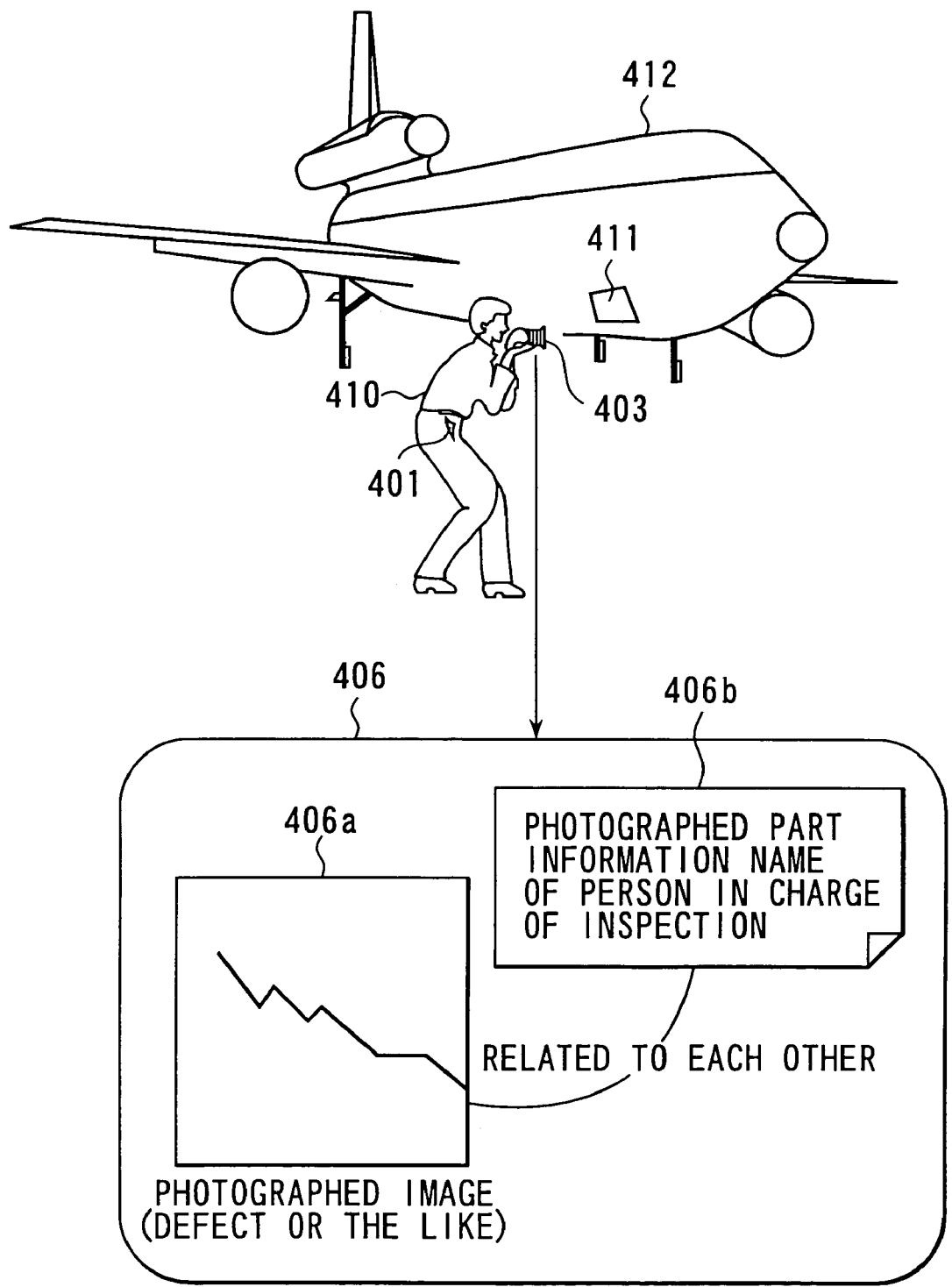
FIG. 11 is a schematic view for explaining another example of a camera system according to the third embodiment of the present invention.

For example, as shown in FIG. 11, information of photographing part can be recorded at the time of photographing along with information of the photographer 410 by setting an IC tag 411 for each place to be checked as in the case of checking a body of an airplane 412 as a subject.

Figure 12:
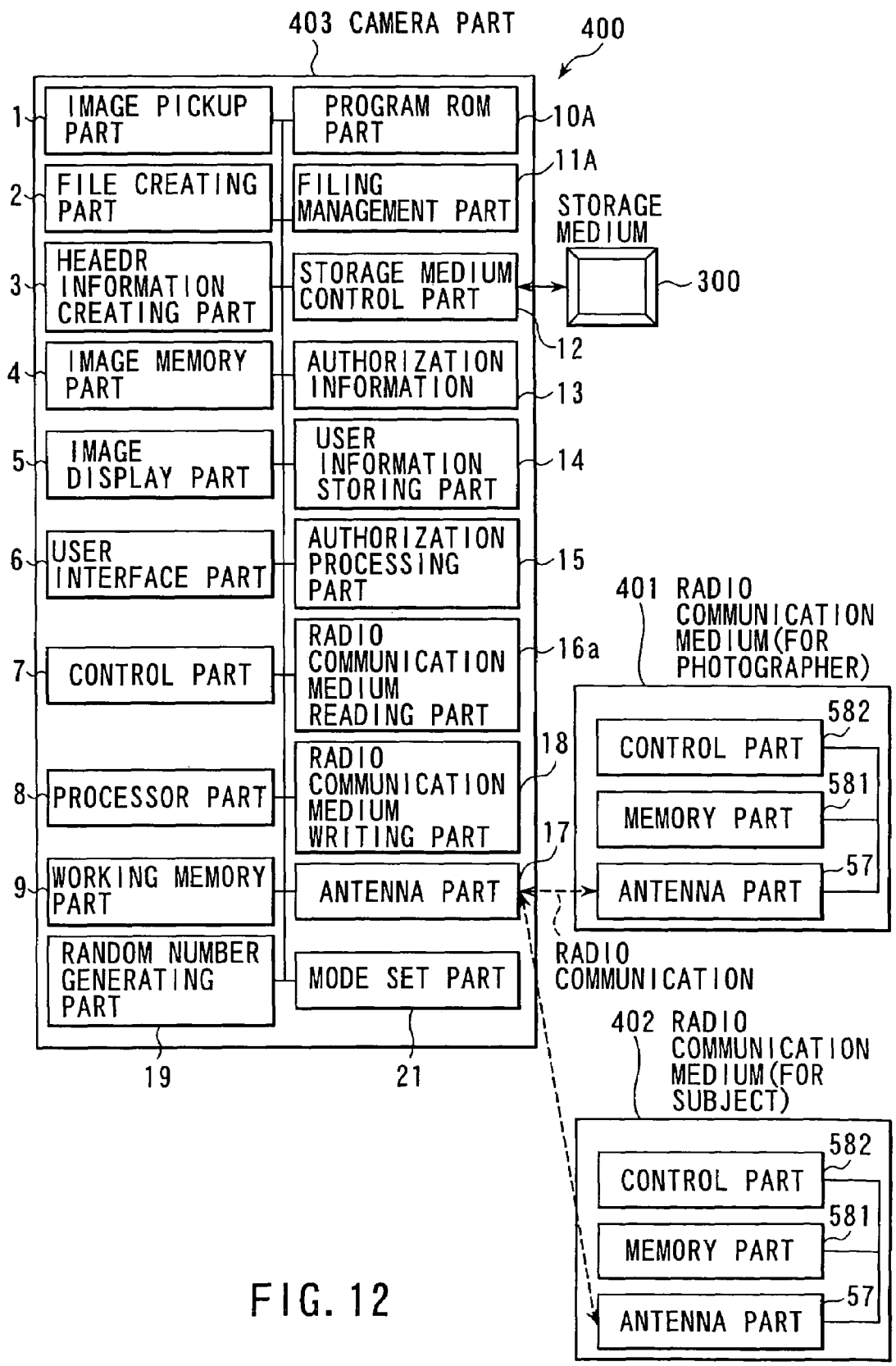
FIG. 12 is a block diagram showing a constitution of an information processing system according to the third embodiment of the present invention.

FIG. 12 is a block diagram showing a constitution of a camera system according to the third embodiment of the present invention.

That is, this camera system 400 is constituted of a camera 403, a storage medium 104 of an outer part, a radio communication medium 401 for a photographer radio communicating with the camera 403, and radio communication medium 402 for a subject.

The radio communication between the camera 403 and each radio communication medium 401, 402 is executed via the antenna parts 17, 57.

The camera 403 is constituted of the image pickup part 1, the file creating part 2, the header information creating part 3, the image memory part 4, the image display part 5, the user interface part 6, the control part 7, the processor part 8, the working memory part 9, a program ROM part 10A, a filing management part 11A, the storage medium control part 12, the authorization information part 13, the user information storing part 14, the authorization processing part 15, the radio communication medium reading part 16a, the radio communication medium writing part 18, the random number generating part 19, and a mode setting part 21, each connected to the antenna part 17 via an internal bus.

Each radio communication medium 401, 402 is constituted of the memory part 581 and the control part 582, each connected to the antenna part 57 via an internal bus.

In the constitution of the present camera system, the difference from the constitution of the camera system of FIG. 6 described above is that the mode setting part 21 corresponding to the subject information acquisition mode set button 403a is added to the camera 403 part. Other than that, a radio communication function with the radio communication medium 401, 402 for a photographer and a subject is provided in the antenna part 17. Further, since a procedure in a process and a method of a file management for temporarily storing subject information in the working memory part 9 (in the case of storing the photographer's and subject's information in a different file from an image file) differ, the program ROM part 10A and the filing management part 11A differ.

That is, according to this constitution of the camera system, provided is a camera system characterized in that the camera system comprises the radio communication medium 401 in the side of the camera user 408 or 410, the radio communication medium 402 or 411 in the side of the subject 409 or 412, and the camera 403 communicable with the radio communication medium 401, 402, or 411 within a predetermined distance, wherein the camera 403 comprises the image pickup part 1 for obtaining image data by photographing the subject 409 or 412, the user information storing part 14 as a storing part for storing in advance the information peculiar to the camera user 408, 410, the image memory part 4 as an information record part for recording, while relating to a file of the image data, information peculiar to the subject 409 or 412 photographed employing the camera 403, the radio communication medium reading part 16a as a radio communication medium reading part for transmitting a predetermined radio signal via the antenna part 17 and reading information from each radio communication medium 401, 402, 411 via the antenna part 17, the authorization information part 13 and the authorization processing part 15 as an authorization part for authorizing the camera user by collating information from the radio communication medium 401 of the camera user 408, 410 side read at the radio communication medium reading part 16a as the radio communication medium reading part with the camera user's own information stored in the user information storing part 14 as the storing part, the working memory part 9 as an information maintenance part for temporarily maintaining information from the radio communication medium 402 or 411 of the subject 409 or 412 side read at the radio communication medium reading part 16a as the radio communication medium reading part as information peculiar to the subject 409 or 412, and the control part 7 as a means for recording information peculiar to the subject 409 or 412 that is information read from the radio communication mediums 402, 411 maintained in the working memory part 9 as the information maintenance part, employing the image memory part 4 as the information record part while relating the subject's own information to a file of image data photographed when an image is photographed employing the image pickup part 1, and wherein each radio communication medium 401, 402, 411 comprises the memory part 581 as a storing part for storing predetermined information containing the information peculiar to the camera user 408, 410 or the information peculiar to the subject 409 or 412 and the antenna part 57 and the control part 582 as a transmission part for receiving the predetermined radio signal transmitted from the radio communication medium reading part 16a and the antenna part 17 of the camera 403 and transmitting the predetermined information stored in the memory part 581 as the storing part as a radio signal.

According to a constitution of a camera system, provided is a camera system characterized in that the camera system comprises the radio communication medium 401 in the side of the camera user 408 or 410, the radio communication medium 402 or 411 in the side of the subject 409 or 412, and the camera 403 communicable with the radio communication medium 401, 402, or 411 within a predetermined distance, wherein the camera 403 comprises the image pickup part 1 for obtaining image data by photographing the subject 409 or 412, the user information storing part 14 as a storing part for storing in advance the information peculiar to the camera user 408, 410, the image memory part 4 as an information record part for recording, while relating to a file of the image data, information peculiar to the subject 409 or 412 photographed employing the camera 403 along with the information peculiar to the camera user 408 or 412, the mode setting part for 21 as a subject information acquisition mode setting part for setting the camera 403 to a mode for acquiring information peculiar to the subject 409 or 412, the radio communication medium reading part 16a as the radio communication medium reading part for transmitting a predetermined radio signal via the antenna part 17 and reading information from each radio communication medium 401, 402, 411 via the antenna part 17, the authorization information part 13 and the authorization processing part 15 as the authorization part for authorizing the camera user by collating the information from the radio communication medium 401 of the camera user 408, 410 side read at the radio communication medium reading part 16a as the radio communication medium reading part with the camera user's own information stored in the user information storing part 14 as the storing part, the working memory part 9 as the information maintenance part for temporarily maintaining the information from the radio communication medium 402 or 411 of the subject 409 or 412 side read at the radio communication medium reading part 16a as the radio communication medium reading part as the information peculiar to the subject 409 or 412, and the control part 7 as a means for recording the information peculiar to the subject 409 or 412 that is the information read from the radio communication mediums 402, 411 maintained in the working memory part 9 as the information maintenance part, employing the image memory part 4 as the information record part along with the information related to the camera user authorized at the authorization information part 13 and the authorization processing part 15 as the authorization part while relating the information to a file of image data photographed when an image is photographed employing the image pickup part 1 in the case in which the subject information acquisition mode is set employing the mode setting part 21 as the subject information acquisition mode setting part, and wherein each radio communication medium 401, 402, 411 comprises the memory part 581 as the storing part for storing predetermined information containing the information peculiar to the camera user 408, 410 or the information peculiar to the subject 409 or 412 and the antenna part 57 and the control part 582 as the transmission part for receiving the predetermined radio signal transmitted from the radio communication medium reading part 16a and the antenna part 17 of the camera 403 and transmitting the predetermined information stored in the memory part 581 as the storing part as a radio signal.

Included in the realm as the information appliance in the above are not only a PC and a workstation, of course, but also an automobile, a household electric appliance, a digital camera, a digital video camera, digital recording/reproducing apparatus, and the like which are considered to be progressed informationally hereafter.

As explained in the above, according to the present invention, it is possible to provide an information processing system and a camera system authorizing an information appliance user and a camera user, or a subject, or both of them in the information processing system comprising a radio communication terminal and an information appliance communicable with the radio communication terminal within a predetermined distance and in the camera system comprising a radio communication medium and a camera communicable with the radio communication medium within a predetermined distance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing system comprising:
  a radio communication terminal; and
  an information appliance communicable with said radio communication terminal within a predetermined distance,
  said information appliance comprising:
   a first storing part for storing information specific to a user of said information appliance, said information specific to the user including information specific to the information appliance;
   a radio communication part for reading information from said radio communication terminal;
   an authorization part for authorizing said user of the information appliance by collating information from said radio communication terminal read by said radio communication part with the information specific to the user of said information appliance including the information specific to the information appliance stored in the first storing part; and
   a user interface part as an input part by which the user requires that the authorization processing is performed; and
  said radio communication terminal comprising:
   a second storing part for storing predetermined information specific to the user; and
   a transmission part for receiving a radio signal transmitted from said information appliance and transmitting, as a radio signal, said predetermined information specific to the user stored in the second storing part.

2. The information processing system according to claim 1, wherein said radio communication terminal comprises a portable telephone, the information specific to the user comprises a telephone number, and the telephone number differs for each user.

3. The information processing system according to claim 1, wherein said radio communication terminal employs an operation part of a portable telephone to transmit a code number in addition to the information specific to the user.

4. The information processing system according to claim 1, wherein said information appliance further comprises a control part for controlling the radio communication terminal reading part so that the directivity of an electromagnetic wave transmitted from the radio communication terminal reading part is made high.

5. The information processing system according to claim 1, wherein the information appliance comprises a personal computer.

6. The information processing system according to claim 5, wherein the information appliance comprises a stationary type personal computer.

7. The information processing system according to claim 1, wherein the information appliance comprises one of a household electric appliance and a consumer electronics product.

8. The information processing system according to claim 1, wherein the radio communication terminal comprises a non-contact IC card.

9. The information processing system according to claim 1, wherein the radio communication terminal comprises a wearable non-contact type radio communication terminal.

10. The information processing system according to claim 9, wherein the radio communication terminal comprises a non-contact tag.

11. The information processing system according to claim 1, wherein the information appliance further comprises
  a control part for supplying power to the radio communication part when the authorization processing is required through the user interface part, and the control part stops supplying power to the radio communication part after a predetermined time period.

12. The information processing system according to claim 11, wherein the information appliance comprises a personal computer.

13. The information processing system according to claim 12, wherein the information appliance comprises a stationary type personal computer.

14. The information processing system according to claim 11, wherein the information appliance comprises one of a household electric appliance and a consumer electronics product.

15. The information processing system according to claim 11, wherein the radio communication terminal comprises a non-contact IC card.

16. The information processing system according to claim 11, wherein the radio communication terminal comprises a wearable non-contact type radio communication terminal.

17. The information processing system according to claim 16, wherein the radio communication terminal comprises a non-contact tag.

18. An information processing system comprising:
  a radio communication terminal; and
  an information appliance communicable with the radio communication terminal within a predetermined distance,
  said radio communication terminal comprising:
   a first storing part for storing predetermined information, which comprises user-specific information for an appliance user;
   a transmission part for receiving a radio signal transmitted from the information appliance and transmitting, as a radio signal, the predetermined information stored in the first storing part; and
  said information appliance comprising:
   a second storing part for storing information specific to a user of the information appliance;
   a radio communication part for reading information from the radio communication terminal;
   an authorization part for collating information from the radio communication terminal read by the radio communication part with the information specific to the user of the information appliance stored in the second storing part, and for allowing the appliance user to use the information appliance if the information from the radio communication terminal coincides with the information specific to the user of the information appliance; and a controller for controlling the authorization part, such that registration and de-registration of an appliance user as a user of the information appliance by the authorization part can be performed only when a predetermined appliance user is authorized by the authorization part.

19. The information processing system according to claim 18, wherein the radio communication terminal comprises a non-contact IC card.

20. The information processing system according to claim 19, further comprising a non-contact IC card for the predetermined appliance user as a system manager.

21. The information processing system according to claim 18, wherein the radio communication terminal comprises a portable telephone.

* * * * *